United States Patent
Huang

(10) Patent No.: US 12,402,695 B2
(45) Date of Patent: Sep. 2, 2025

(54) SPOOL, TIGHTENING DEVICE WITH SPOOL, AND COUPLING METHOD OF SPOOL AND LACE

(71) Applicant: SHENZHEN ICOMWELL INTELLIGENT MEDICAL TECHNOLOGY CO., LTD., Shenzhen (CN)

(72) Inventor: Wei Huang, Shenzhen (CN)

(73) Assignee: SHENZHEN ICOMWELL INTELLIGENT MEDICAL TECHNOLOGY CO., LTD., Shenzhen (CN)

( * ) Notice: Subject to any disclaimer, the term of this patent is extended or adjusted under 35 U.S.C. 154(b) by 182 days.

(21) Appl. No.: 18/342,785

(22) Filed: Jun. 28, 2023

(65) Prior Publication Data
US 2024/0197040 A1    Jun. 20, 2024

(30) Foreign Application Priority Data

Dec. 15, 2022   (CN) .......................... 202211616327.2
Dec. 15, 2022   (CN) .......................... 202211616513.6

(51) Int. Cl.
*A43C 1/06* (2006.01)
*F16G 11/12* (2006.01)

(52) U.S. Cl.
CPC .............. *A43C 1/06* (2013.01); *F16G 11/12* (2013.01)

(58) Field of Classification Search
CPC .......... A43C 1/06; A43C 11/165; A43C 11/20; A43C 7/00; A43C 11/008; A43C 11/14;
(Continued)

(56) References Cited

U.S. PATENT DOCUMENTS 1,874,606 A * 8/1932 Palmer .................. B65H 75/14
                                              242/610.4
1,925,277 A * 9/1933 Paimer .................. B65H 75/14
                                              242/118.4
(Continued)

FOREIGN PATENT DOCUMENTS

CN         205585439 U     9/2016
CN         208403438 U     1/2019
(Continued)

*Primary Examiner* — Jason W San
*Assistant Examiner* — Louis A Mercado
(74) *Attorney, Agent, or Firm* — Bayramoglu Law Offices LLC

(57) ABSTRACT

A spool, a tightening device with the spool, and a coupling method of the spool and a lace are provided. A first free end and a second free end of the lace are routed in subtended directions along a first routing path and a second routing path, respectively. The first routing path and the second routing path are designed in separate grade crossing structure. Even if the first free end and the second free end are routed simultaneously, they will not collide with each other. When the lace is knotted, there is no strict requirement for the length of a reserved tail of the lace. Even if the tail of the lace is left outside a housing, the tail of the lace can be wound onto the spool by rotating the spool, without affecting the normal operation of the tightening device. The method achieves easy, quick, and accurate lace coupling.

17 Claims, 11 Drawing Sheets

(58) Field of Classification Search
CPC ..... F16G 11/12; B65H 75/14; B65H 75/4471; B65H 75/4492; B65H 2701/36
See application file for complete search history.

(56) References Cited

U.S. PATENT DOCUMENTS

| | | | | |
|---|---|---|---|---|
| 2,339,432 | A * | 1/1944 | Stahl | B65H 75/14 310/194 |
| 6,502,286 | B1 * | 1/2003 | Dubberke | A43C 7/00 24/712.1 |
| 7,367,522 | B2 * | 5/2008 | Chen | A43C 7/00 242/378.1 |
| 7,516,914 | B2 * | 4/2009 | Kovacevich | A43C 11/165 242/395 |
| 7,950,112 | B2 * | 5/2011 | Hammerslag | A43B 5/16 36/50.5 |
| 7,954,204 | B2 | 6/2011 | Hammerslag et al. | |
| 8,231,074 | B2 * | 7/2012 | Hu | A43C 11/20 242/388.2 |
| 9,339,089 | B2 * | 5/2016 | So | A44B 99/00 |
| 9,408,437 | B2 * | 8/2016 | Goodman | B65H 75/4431 |
| 9,706,814 | B2 * | 7/2017 | Converse | A61F 5/0123 |
| 9,717,305 | B2 * | 8/2017 | Midorikawa | A43C 11/165 |
| 10,076,160 | B2 | 9/2018 | Burns et al. | |
| 10,368,613 | B2 * | 8/2019 | Ha | A43C 7/00 |
| 10,433,602 | B2 * | 10/2019 | Kim | B65H 75/4471 |
| 10,477,922 | B2 * | 11/2019 | Lovett | A43C 3/02 |
| 10,772,388 | B2 * | 9/2020 | Burns | A43C 9/00 |
| 10,842,230 | B2 * | 11/2020 | Pollack | A43C 7/00 |
| 10,849,390 | B2 * | 12/2020 | Hammerslag | A43B 5/1666 |
| 10,856,620 | B2 * | 12/2020 | Huang | A43C 11/20 |
| 10,874,175 | B2 * | 12/2020 | So | A44B 11/065 |
| 10,888,139 | B2 * | 1/2021 | Burns | A43B 13/14 |
| 10,945,492 | B2 * | 3/2021 | Kim | A43C 7/08 |
| 11,122,865 | B2 * | 9/2021 | Burt | A43C 11/20 |
| 11,219,275 | B2 * | 1/2022 | Kawano | B65H 75/4402 |
| 11,390,486 | B2 * | 7/2022 | Ha | A43C 11/165 |
| 11,633,018 | B2 * | 4/2023 | Burt | E05C 3/145 242/395 |
| 11,647,813 | B1 * | 5/2023 | Rao | A43C 11/165 24/199 |
| 11,684,122 | B2 * | 6/2023 | Burns | A61F 5/0118 36/50.1 |
| 11,744,329 | B2 * | 9/2023 | Ha | A43C 11/165 24/712.9 |
| 11,751,634 | B2 * | 9/2023 | Chen | A43C 11/06 24/712.2 |
| 11,839,265 | B2 * | 12/2023 | So | A43C 11/165 |
| 11,982,334 | B1 * | 5/2024 | Jiang | A43C 7/00 |
| 12,116,238 | B2 * | 10/2024 | Huang | A43C 11/165 |
| 12,250,997 | B2 * | 3/2025 | Kim | A41F 1/008 |
| 2005/0098673 | A1 * | 5/2005 | Huang | A43C 7/00 242/396.5 |
| 2006/0015988 | A1 * | 1/2006 | Philpott | A42B 3/14 2/410 |
| 2010/0139057 | A1 * | 6/2010 | Soderberg | B65H 75/4434 242/396.2 |
| 2011/0167543 | A1 * | 7/2011 | Kovacevich | F16G 11/12 2/417 |
| 2018/0160775 | A1 | 6/2018 | Pollack et al. | |
| 2021/0186159 | A1 * | 6/2021 | Hu | A43C 1/06 |
| 2021/0227937 | A1 * | 7/2021 | Hu | A43C 7/08 |
| 2021/0401121 | A1 * | 12/2021 | Kim | A41F 1/06 |
| 2022/0142304 | A1 * | 5/2022 | Chen | B65H 75/4421 |
| 2024/0197040 | A1 * | 6/2024 | Huang | A43C 1/06 |

FOREIGN PATENT DOCUMENTS

| | | |
|---|---|---|
| CN | 208993976 U | 6/2019 |
| CN | 209067769 U | 7/2019 |
| CN | 215837385 U | 2/2022 |
| CN | 216256587 U | 4/2022 |
| CN | 216272500 U | 4/2022 |
| CN | 216493815 U | 5/2022 |
| CN | 216723374 U | 6/2022 |
| CN | 217524127 U | 10/2022 |
| CN | 217851620 U | 11/2022 |
| JP | H06237802 A | 8/1994 |
| KR | 100399950 B1 | 9/2003 |
| WO | 2020050562 A1 | 3/2020 |
| WO | 2022148002 A1 | 7/2022 |

\* cited by examiner

SPOOL, TIGHTENING DEVICE WITH SPOOL, AND COUPLING METHOD OF SPOOL AND LACE

CROSS REFERENCE TO THE RELATED APPLICATIONS

This application is based upon and claims priority to Chinese Patent Applications No. 202211616513.6 and No. 202211616327.2, both filed on Dec. 15, 2022, the entire contents of which are incorporated herein by reference.

TECHNICAL FIELD

The present disclosure relates to the technical field of lacing, and in particular to a spool, a tightening device with the spool, and a coupling method of the spool and a lace.

BACKGROUND

At present, automatic tightening devices have been applied to the field of shoes and bags, providing great convenience for people's lives. With the popularization of automatic tightening devices, the market demand for automatic tightening devices is increasing, and the simplification of production and assembly procedures has become a hot topic of concern for manufacturers. As an essential part of the automatic tightening device, the spool is configured to wind a lace, and to wind up the lace so as to tighten an item or unwind the lace so as to loosen the item. The spool is generally an I-shaped wheel, including two base plates and an axial cylinder. An outer region of the axial cylinder between the two base plates forms a circular groove, which defines a space for accommodating the lace winded up. In order to achieve the function of winding up and unwinding the lace on the spool, it is necessary to couple the lace with the spool.

SUMMARY

The present disclosure described herein provide a spool usually used in a tightening device that may be used to tension a lace or tension member and thereby tighten an article or other item. More specifically, one objective of the present disclosure is to propose a spool and a coupling method of the spool and a lace.

The present disclosure provides a spool. The spool is configured to be coupled with and wind a lace, and includes an axial cylinder, a first base plate, and a second base plate, where the first base plate and the second base plate are located at opposite ends of the axial cylinder, and an outer region of the axial cylinder between the first base plate and the second base plate forms a groove for winding the lace; where
    the axial cylinder is provided with an inner chamber; a side wall of the axial cylinder is provided with a first lace insertion hole, a second lace insertion hole, a first lace exit hole, and a second lace exit hole; the first lace insertion hole and the first lace exit hole are located on opposite sides of the axial cylinder; and the second lace insertion hole and the second lace exit hole are located on opposite sides of the axial cylinder; and
    the first lace insertion hole, the inner chamber of the axial cylinder, and the first lace exit hole form a first routing path; the second lace insertion hole, the inner chamber of the axial cylinder, and the second lace exit hole form a second routing path; and the first routing path and the second routing path are designed in separate grade crossing structure.

In the present disclosure, the separate grade crossing structure, also known as an isolated grade crossing structure or a non-interconnected grade crossing structure, refers to a crossing structure between two paths that are not interconnected with each other. The separate grade crossing structure includes complete separation where there is a distance difference between an upper path and a lower path at a grade crossing point, and also includes zero-distance contact between a lower edge of the upper path and an upper edge of the lower path at the grade crossing point. The upper path, the lower path, the upper edge, and the lower edge are determined based on actual spatial positions of the two paths in the spool during routing, and refer to upper and lower positions at the grade crossing point. The upper-lower position relationship between the first routing path and the second routing path at other spatial position may be different from that at the grade crossing point. The projection of the grade crossing point on a plane of the first base plate or the second base plate is a crossing point of the projection lines of the two paths.

According to another aspect, the first base plate and the second base plate are arranged in parallel.

In the present disclosure, the axial cylinder includes two sides based on a symmetry plane of the axial cylinder, which is a plane determined by a symmetrical axis of the first base plate and a central axis of the axial cylinder. In step S1, a same side of the axial cylinder refers to a same side of the symmetry plane of the axial cylinder, while opposite sides of the axial cylinder refers to two sides of the symmetry plane of the axial cylinder.

According to another aspect, the first lace insertion hole and the second lace exit hole are located on a same side of the axial cylinder, and the second lace insertion hole and the first lace exit hole are located on a same side of the axial cylinder.

According to another aspect, a projection line of a central axis of the first lace insertion hole and a projection line of a central axis of the first lace exit hole are at an angle of 135-180° or parallel to each other on a plane of the first base plate.

According to another aspect, a projection line of a central axis of the second lace insertion hole and a projection line of a central axis of the second lace exit hole are at an angle of 135-180° or parallel to each other on a plane of the first base plate.

According to another aspect, each of the first routing path and the second routing path is substantially a straight line.

In the present disclosure, the routing path is substantially a straight line, that is, the routing path is a straight line or a curve with a very small curvature. If the routing path is substantially a straight line, the curvature of the line is equal to or approaches 0.

According to another aspect, a curvature of the first routing path or the second routing path is less than 0.1.

According to another aspect, each of the first lace insertion hole and the second lace insertion hole is a symmetrical hole.

According to another aspect, a center of the first lace insertion hole and a center of the second lace insertion hole are located at different axial heights of the axial cylinder. In the present disclosure, the axial height refers to the axial distance from the lower base plate to the plane that passes through a point on the axial cylinder and is parallel to the lower base plate. In an actual use of the spool, the base plate located above is called the upper base plate, and the base plate located below is called the lower base plate. Specifically, in the present disclosure, during lace coupling with the spool, the first base plate is the upper base plate, and the second base plate is the lower base plate. Due to the axial height difference between the centers of the first lace insertion hole and the second lace insertion hole, separate grade crossing structure is achieved between the first routing path and the second routing path.

According to another aspect, each of the first lace insertion hole and the second lace insertion hole is provided with a trumpet-shaped structure. In the trumpet-shaped structure, a smaller end is defined as an exit end configured to allow the lace to exit the lace insertion hole and enter the inner chamber of the axial cylinder, and to stop a knot of the lace after knotting so as to couple the lace with the spool.

According to another aspect, in the trumpet-shaped structure, the central axis of the lace insertion hole is parallel to the plane of the first base plate or the second base plate.

According to another aspect, the central axis of the first lace insertion hole and the central axis of the second lace insertion hole are parallel to the first base plate or the second base plate, but have different distances from the first base plate or the second base plate; and projection of the central axis of the first lace insertion hole and projection of the central axis of the second lace insertion hole on the first base plate or the second base plate intersect with each other.

According to another aspect, a size of the first lace exit hole is larger than a size of the first lace insertion hole; and a size of the second lace exit hole is larger than a size of the second lace insertion hole.

According to another aspect, a center of the first lace exit hole and a center of the second lace exit hole are located at a same axial height or different axial heights of the axial cylinder. The size of the lace exit hole can be larger than the size of the lace insertion hole. Therefore, even if the two lace insertion holes are located at different axial heights of the axial cylinder, as long as the size of the corresponding lace insertion hole is sufficiently large, the lace that exits from the lace insertion hole to the inner chamber of the axial cylinder can reach the lace insertion hole along a straight line and exit from the inner chamber of the axial cylinder through the lace insertion hole. The position where the lace exits from the lace exit hole is not limited to the center position of the lace exit hole, as long as it can exit from the lace exit hole. For example, the position where the lace exits from the lace exit hole can be at the center of the lace exit hole, above the center of the lace exit hole, to the left of the center of the lace exit hole, or to the right of the center of the lace exit hole. Therefore, the two lace exit holes can be located at the same axial height or different axial heights of the axial cylinder.

According to another aspect, the first lace exit hole and the second lace exit hole are identical in terms of size and shape, and are symmetrically arranged. The symmetrical arrangement means that the first lace exit hole and the second lace exit hole are symmetrical about the symmetry plane of the axial cylinder and have the same shape and size.

According to another aspect, the axial heights of the first lace exit hole and the second lace exit hole are 80-100% of a height of the groove for winding the lace. Specifically, the axial heights of the first lace exit hole and the second lace exit hole are denoted h, and the axial height of the groove for winding the lace is denoted H, 80% H≤h≤H.

According to another aspect, the first lace exit hole is a rectangle or rounded rectangle.

According to another aspect, the second lace exit hole is a rectangle or rounded rectangle.

According to another aspect, according to an embodiment of the present disclosure, the first base plate and the second base plate extend radially outward from the axial cylinder.

In the present disclosure, the side wall of the axial cylinder is only provided with the lace insertion holes, and there is no channel for guiding routing. Therefore, the inner chamber of the axial cylinder can be relatively small. Even if the lace insertion hole is a trumpet-shaped structure formed by a thickness of the wall of the axial cylinder, the required space inside the inner chamber of the axial cylinder is still very small compared to the case with a guiding channel. Therefore, the outer diameter of the entire axial cylinder is reduced, and the lace accommodation capacity of the spool is improved.

The present disclosure further proposes a coupling method of a spool and a lace, including the following steps:

S1: providing a spool, including an axial cylinder, a first base plate, and a second base plate, where the first base plate and the second base plate are located at opposite ends of the axial cylinder, and an outer region of the axial cylinder between the first base plate and the second base plate forms a groove for winding the lace; the axial cylinder is provided with an inner chamber; a side wall of the axial cylinder is provided with a first lace insertion hole, a second lace insertion hole, a first lace exit hole, and a second lace exit hole; the first lace insertion hole and the first lace exit hole are located on opposite sides of the axial cylinder; and the second lace insertion hole and the second lace exit hole are located on opposite sides of the axial cylinder;

S2: providing the lace, including a first free end and a second free end; allowing the first free end to enter the inner chamber of the axial cylinder from the first lace insertion hole, reach the first lace exit hole along a first routing path, and exit to the outer region of the axial cylinder; and allowing the second free end to enter the inner chamber of the axial cylinder from the second lace insertion hole, reach the second lace exit hole along a second routing path, and exit to the outer region of the axial cylinder, where the first routing path and the second routing path are designed in separate grade crossing structure;

S3: knotting the first free end and the second free end at the outer region of the axial cylinder, where each of the first free end and the second free end includes a tail and a knot after knotting; and S4: pulling back the lace, such that at least the knot of the lace is pulled back into the inner chamber of the axial cylinder, and the lace is coupled with the spool.

In the present disclosure, the lace enters the inner chamber of the axial cylinder from the first lace insertion hole of the spool and reaches the first lace exit hole on the opposite side along the first routing path, that is, the first routing path is a subtended routing path. Similarly, the second routing path is also a subtended routing path. The subtended routing path is short, and the lace substantially runs according to inertia in a natural state. In related art, a channel for guiding routing applies a certain force to the lace to force it to follow an established track arc. In contrast, subtended routing is easier to achieve blind operation. If there is no observation window provided, the channel for guiding routing is easy to an error of missing some route.

According to another aspect, step S2 includes: allowing the first free end to pass through the first lace insertion hole from an upper space of the first lace insertion hole, a region close to a central axis of the first lace insertion hole, or a lower space of the first lace insertion hole to enter the inner chamber of the axial cylinder.

According to another aspect, step S2 includes: allowing the second free end to pass through the second lace insertion hole from an upper space of the second lace insertion hole, a region close to a central axis of the second lace insertion hole, or a lower space of the second lace insertion hole to enter the inner chamber of the axial cylinder.

Here, the upper space, the region close to the central axis, and the lower space of the first lace insertion hole are obtained through division in an axial height of the lace insertion hole by using the central axis of the lace insertion hole as a base-line. For example, a region within 20% the axial height above and below the central axis is defined as the region close to the central axis. A region above an uppermost edge of the region close to the central axis is defined as the upper space of the lace insertion hole, and a region below a lowermost edge of the region close to the central axis is defined as the lower space of the lace insertion hole.

In step S2, the routing sequence of the first free end and the second free end is not limited. The first free end and the second free end may be routed sequentially, or the first free end and the second free end may be routed simultaneously.

According to another aspect, step S2 includes: allowing one free end of the first free end and the second free end to pass through the lace insertion hole from the upper space to enter the inner chamber of the axial cylinder, while the other free end to pass through the lace insertion hole from the lower space to enter the inner chamber of the axial cylinder.

According to another aspect, step S2 includes: allowing one free end of the first free end and the second free end to pass through an uppermost space of the first lace insertion hole and the second lace insertion hole to enter the inner chamber of the axial cylinder, and allowing the other free end of the first free end and the second free end to pass through a lowermost space of the first lace insertion hole and the second lace insertion hole to enter the inner chamber of the axial cylinder. The uppermost space of the first lace insertion hole and the second lace insertion hole refers to an uppermost space of an upper lace insertion hole in the two lace insertion holes. Similarly, the lowermost space of two lace insertion holes refers to a lowermost space of a lower lace insertion hole in the two lace insertion holes.

In the present disclosure, the two lace insertion holes are located at different axial heights of the axial cylinder. During the lace coupling process, an lace insertion hole located at a higher axial height is defined as the upper lace insertion hole, while the lace insertion hole located at a lower axial height is defined as the lower lace insertion hole. Extension directions of the first routing path and the second routing path are substantially determined by the routing direction of the lace in the first lace insertion hole and the second lace insertion hole. One free end passes through the lace insertion hole from the uppermost space of the upper lace insertion hole to enter the inner chamber of the axial cylinder, while the other free end passes through the lower lace insertion hole from the lowermost space of the lower lace insertion hole to enter the inner chamber of the axial cylinder. Therefore, in the case of a determined difference in the center heights of the first lace insertion hole and the second lace insertion hole, the first routing path and the second routing path can achieve maximum separation in the axial space, thereby reducing the height of the spool and achieving miniaturization of the tightening device.

In the present disclosure, both the first routing path and the second routing path can be parallel to the plane of the first base plate or the second base plate. Alternatively, one of the first routing path and the second routing path is parallel to the plane of the first base plate or the second base plate. Alternatively, none of the first routing path and the second routing path is parallel to the plane of the first base plate or the second base plate. Any design must meet the condition that the two routing paths are designed in separate grade crossing structure at a grade crossing point.

In a preferred embodiment, at least one of the first routing path and the second routing path is parallel to the plane of the first base plate or the second base plate.

According to another aspect, in step S2, the first free end and the second free end are two free ends from one lace or two laces.

According to another aspect, each of the first lace insertion hole and the second lace insertion hole includes an entry end and an exit end; a size of the exit end is smaller than a size of the entry end; and step S4 includes: pulling back the lace until the knot of the lace is stuck at the exit end of the first lace insertion hole and the second lace insertion hole.

According to another aspect, each of the first lace insertion hole and the second lace insertion hole is provided with a trumpet-shaped structure; and step S4 includes: pulling back the lace until the knot of the lace is stuck at the exit end of the trumpet-shaped lace insertion hole.

According to another aspect, the first base plate includes an opening communicated with the inner chamber of the axial cylinder; and step S2 includes: observing a routing status of the first free end and the second free end in the inner chamber of the axial cylinder through the opening. The opening improves the routing accuracy.

According to another aspect, step S4 includes: pulling back the lace, such that the knot of the lace is pulled back into the inner chamber of the axial cylinder, while an end of the tail of the lace is left in the outer region of the axial cylinder.

According to another aspect, if the end of the tail of the lace is left in the outer region of the axial cylinder, the method further includes step S5: rotating the spool, such that the tail of the lace is wound in the groove of the spool.

According to another aspect, step S4 includes: pulling back the lace, such that the knot of the lace and an end of the tail of the lace are pulled back into the inner chamber of the axial cylinder.

Another objective of the present disclosure is to propose a tightening device with a spool and a coupling method of the tightening device and a lace.

The present disclosure further provides a tightening device with a spool. The tightening device includes: a housing, provided with an inner region; a rotatable cover, rotatably connected to the housing; and the spool, configured to be coupled with and wind a lace and rotatably provided in the inner region of the housing, where the spool includes an axial cylinder, a first base plate, and a second base plate, and the first base plate and the second base plate are located at opposite ends of the axial cylinder, and an outer region of the axial cylinder between the first base plate and the second base plate forms a groove for winding the lace;

the housing is further provided with a first entrance and a second entrance for the lace to enter the inner region of the housing from an outer region of the housing; the housing is further provided with a first exit and a second exit for the lace to exit from the inner region of the housing to the outer region of the housing; the first entrance and the first exit are located on opposite sides of the housing; and the second entrance and the second exit are located on opposite sides of the housing;

the axial cylinder is provided with an inner chamber; a side wall of the axial cylinder is provided with a first lace insertion hole, a second lace insertion hole, a first lace exit hole, and a second lace exit hole; the first lace insertion hole and the first lace exit hole are located on opposite sides of the axial cylinder; and the second lace insertion hole and the second lace exit hole are located on opposite sides of the axial cylinder; and when the spool is rotated to an alignment position with the housing, the first entrance of the housing, the first lace insertion hole of the spool, the inner chamber of the axial cylinder, the first lace exit hole of the spool, and the first exit of the housing form a first routing path of the tightening device; the second entrance of the housing, the second lace insertion hole of the spool, the inner chamber of the axial cylinder, the second lace exit hole of the spool, and the second exit of the housing form a second routing path of the tightening device; and the first routing path and the second routing path of the tightening device are designed in separate grade crossing structure.

When the housing and the spool are in the alignment position, the first lace insertion hole of the spool is aligned with the first entrance of the housing, the second lace insertion hole of the spool is aligned with the second entrance of the housing; the first lace exit hole of the spool is aligned with the first exit of the housing, and the second lace exit hole of the spool is aligned with the second exit of the housing.

The alignment between the first lace insertion hole of the spool and the first entrance of the housing is not strictly the alignment between a center of the first lace insertion hole and a center of the first entrance, as long as the first entrance is aligned with a part of the first lace insertion hole. This applies to hole-hole alignment and hole-entrance/exit alignment in the present disclosure, that is, partial alignment is enough.

According to another aspect, the first entrance and second exit are located on a same side of the housing, and the second entrance and first exit are located on a same side of the housing.

In the present disclosure, similar to the definition of two sides of the axial cylinder, the housing includes two sides based on a symmetry plane of the housing. The same side of the housing refers to a same side of the symmetry plane of the housing, while the opposite sides of the housing refer to two sides of the symmetry plane of the housing.

According to another aspect, a central axis of the first entrance and a central axis of the second entrance intersect in a same plane. This plane is perpendicular to a central axis of the housing.

According to another aspect, the first entrance and the second entrance are symmetrically arranged. That is, the first entrance and the second entrance are respectively arranged on two sides of the symmetry plane of the housing, and have the same shape and size.

According to another aspect, each of the first entrance and the second entrance is provided with a lug structure.

According to another aspect, a central axis of the first exit and a central axis of the second exit intersect in a same plane. This plane is perpendicular to a central axis of the housing.

According to another aspect, the first exit and the second exit are symmetrically arranged. That is, the first entrance and the second entrance are respectively arranged on two sides of the symmetry plane of the housing, and have the same shape and size.

According to another aspect, the first routing path of the tightening device is substantially a straight line, and the second routing path of the tightening device is substantially a straight line, too. In the present disclosure, the first routing path of the aforementioned spool forms a part of the first routing path of the tightening device; and the second routing path of the aforementioned spool forms a part of the second routing path of the tightening device.

According to another aspect, a stop pin is provided on a bottom surface of the second base plate; the rotatable cover is provided with a retaining ring member; and the retaining ring member is matched with the stop pin to form a position switching mechanism of the tightening device.

The position switching mechanism can provide at least two positions for the tightening device, and the switching of each two positions is achieved by the axial movement of the rotatable cover relative to the housing.

According to another aspect, the stop pin is integrally formed with the spool.

According to another aspect, the stop pin extends along the axial direction of the axial cylinder away from a side of the second base plate.

According to another aspect, according to an embodiment of the present disclosure, the stop pin is an elastic stop pin.

According to another aspect, an end surface of the second base plate is provided with engaging teeth.

According to another aspect, the engaging teeth surround the stop pin.

According to another aspect, the retaining ring member is integrally formed with the rotatable cover.

According to another aspect, the retaining ring member and the rotatable cover are formed separately and connected together.

According to another aspect, a center of the retaining ring member is provided with a hollow post, and a side wall of the hollow post is provided with a retaining ring. When a position is switched, the position of axial movement of the rotatable cover relative to the housing is mainly fixed by the stop pin and the retaining ring that are matched with each other.

According to another aspect, the retaining ring member is further provided with engaging teeth; and the engaging teeth of the retaining ring member surround the hollow post, and are able to mesh with the engaging teeth of the spool.

According to another aspect, the first base plate includes an opening communicated with the inner chamber of the axial cylinder.

First, in the present disclosure, the stop pin is provided at one side of the second base plate of the spool. The inner chamber at one side of the first base plate is vacated to communicate with the outer region and form an opening. This opening is configured to observe the routing path, improving the routing accuracy. In related art, the stop pin is an independent component that runs through the center of the inner chamber of the axial cylinder and is positioned. It is not possible to guide the lace to walk in the subtended direction, and it is necessary to bypass the stop pin for routing on the same side. In addition, due to the obstruction of the stop pin, it is not possible to observe the routing status inside the inner chamber of the axial cylinder from the outside. The channel imposes intervention on routing on the same side, resulting in frequent cases of missed or incorrect routing. In the present disclosure, the spool can avoid missed or incorrect routing. Second, the stop pin is provided at one side of the second base plate of the spool, eliminating the process of assembling the stop pin. Moreover, the integrated structure of the spool and stop pin achieves miniaturization and integration of the tightening device. Third, in the present disclosure, the inner chamber of the axial cylinder is sufficiently large to fully store the knot of the lace, so the knot of the lace will not affect the normal operation of other component. In related art, the stop pin that runs through the center of the inner chamber of the axial cylinder sometimes contacts and rubs against the knot of the lace, causing significant resistance to the spool during rotation.

The spool is usually provided with two lace insertion holes, which correspond to two free ends from one lace or two laces. This design is conducive to the balance of the entire tightening device when the lace is tightened. When the lace is coupled with the spool of the tightening device, the subtended routing method is used. The subtended routing path is short, and the lace substantially runs according to inertial in a natural state, which is easy for blind operation. In addition, fast coupling with the lace can be achieved by coupling the two free ends simultaneously.

According to another aspect, according to an embodiment of the present disclosure, each of the spool and the housing includes an alignment mark to indicate whether the spool reaches an alignment position with the housing.

According to another aspect, the tightening device further includes a base; and the base is independent of other component of the tightening device and attached to a wearable item.

According to another aspect, the base includes an inner chamber; and the housing is provided in the inner chamber of the base.

According to another aspect, a side of the first base plate of the spool faces the base. In the present disclosure, the knot of the lace after knotting can be hidden in the inner chamber of the axial cylinder. The depth from the inner chamber of the axial cylinder to the end surface of the first base plate is sufficiently large, so the knot of the lace will not protrude from the end surface of the first base plate, and the knot will not affect the rotation of the spool. In related art, the spool utilizes a guide slope to route and knots the lace outside the opening of the first base plate. The guide slope reduces the depth and area of the inner chamber of the axial cylinder, so the knot of the lace can easily run out of the end surface of the first base plate, causing the knot to get stuck between the spool and the base, resulting in the inability of the spool to rotate freely and smoothly.

According to another aspect, the base includes a mounting flange and a retaining wall; the retaining wall is protruded on a surface of the mounting flange, and surrounds the inner chamber of the base; a bottom of the housing is provided in the inner chamber of the base; and the first exit and the second exit of the housing are at least partially exposed outside the inner chamber of the base.

The present disclosure further proposes a coupling method of a tightening device with a spool and a lace, including the following steps:

S1: providing a main part of the tightening device, including a rotatable cover, a housing, and the spool, where the housing is provided with an inner region; the rotatable cover is rotatably connected to the housing; the spool is configured to be coupled with and wind a lace, and is rotatably provided in the inner region of the housing; the spool includes an axial cylinder, a first base plate, and a second base plate, where the first base plate and the second base plate are located at opposite ends of the axial cylinder, where an outer region of the axial cylinder between the first base plate and the second base plate forms a groove for winding the lace; the axial cylinder is provided with an inner chamber; a side wall of the axial cylinder is provided with a first lace insertion hole, a second lace insertion hole, a first lace exit hole, and a second lace exit hole; the first lace insertion hole and the first lace exit hole are located on opposite sides of the axial cylinder; and the second lace insertion hole and the second lace exit hole are located on opposite sides of the axial cylinder;

the housing is further provided with a first entrance and a second entrance for the lace to enter the inner region of the housing from an outer region of the housing; the housing is further provided with a first exit and a second exit for the lace to exit from the inner region of the housing to the outer region of the housing; the first entrance and the first exit are located on opposite sides of the housing; and the second entrance and the second exit are located on opposite sides of the housing;

S2: rotating the spool, such that the first lace insertion hole of the spool is aligned with the first entrance of the housing, the second lace insertion hole of the spool is aligned with the second entrance of the housing; the first lace exit hole of the spool is aligned with the first exit of the housing, and the second lace exit hole of the spool is aligned with the second exit of the housing;

S3: providing the lace, including a first free end and a second free end, where the first free end enters the inner chamber of the axial cylinder from the first entrance and the first lace insertion hole, reaches the first lace exit hole along a first routing path, and exits from the first exit to the outer region of the housing; the second free end enters the inner chamber of the axial cylinder from the second entrance and the second lace insertion hole, reaches the second lace exit hole along a second routing path, and exits from the second exit to the outer region of the housing; and the first routing path and the second routing path are designed in separate grade crossing structure;

S4: knotting the first free end and the second free end at the outer region of the housing, where each of the first free end and the second free end includes a tail and a knot after knotting; and S5: pulling back the lace, such that at least the knot of the lace is pulled back into the inner chamber of the axial cylinder, and the lace is coupled with the main part of the tightening device.

According to another aspect, in step S5, the lace is pulled back, such that the knot of the lace is pulled back into the inner chamber of the axial cylinder, and the end of the tail of the lace is left in the outer region of the axial cylinder or the outer region of the housing.

The end of the tail of the lace is located in the outer region of the axial cylinder. That is, the end of the tail of the lace is located in the inner region of the housing and the outer region of the axial cylinder. In other word, the end of the tail of the lace is located in the groove of the spool.

According to another aspect, in step S5, the lace is pulled back, such that the knot and the end of the tail are both pulled back into the inner chamber of the axial cylinder.

The reason why the existing tightening device does not use subtended routing is that the two lace insertion holes of the existing spool are at the same axial height of the axial cylinder. If the two free ends are routing in subtended directions at the same time, due to the fact that the two routing paths are in the same plane, the two free ends will collide at a crossing. To avoid this problem, it is necessary to knot and pull back one free end before coupling the other free end. In this way, the coupling efficiency is greatly reduced. In addition, since the routing and knotting steps cannot be separated, it is not possible to achieve flow line operation. In addition, if the knot is too large, it will hinder the routing of the other free end after being pulled back. In the present disclosure, the two subtended routing paths cleverly are designed in separate grade crossing structure. The two free ends do not affect each other during routing, greatly improving the accuracy and convenience of routing, and effectively avoiding conflicts between the two free ends. In addition, the routing and knotting steps of the two free ends can be carried out separately, facilitating the flow line operation of the lace coupling process.

According to another aspect, according to an embodiment of the present disclosure, each of the spool and the housing includes an alignment mark; in step S2, the spool is rotated in the inner region of the housing, such that the alignment mark of the spool is aligned with the alignment mark of the housing; thus, the first lace insertion hole of the spool is aligned with the first entrance of the housing; the second lace insertion hole of the spool is aligned with the second entrance of the housing; the first lace exit hole of the spool is aligned with the first exit of the housing; and the second lace exit hole of the spool is aligned with the second exit of the housing.

According to another aspect, the tightening device further includes a base; and the base is independent of the main part of the tightening device and attached to a wearable item. In the present disclosure, the components of the tightening device other than the base form the main part of the tightening device to achieve the tightening and loosening of the lace. The main function of the base is to detachably assemble the tightening device on the wearable item. Therefore, the tightening device may not be provided with the base, but it must be provided with the main part to achieve the tightening function.

According to another aspect, the assembly method of the tightening device with the spool further includes step S6: providing the base, where the base includes an inner chamber, and the main part of the tightening device coupled with the lace is provided in the inner chamber of the base.

Further, a side of the first base plate of the spool faces the base, and an end of the housing away from the rotatable cover is provided in the inner chamber of the base.

In the present disclosure, the knot of the lace after knotting can be hidden in the inner chamber of the axial cylinder. The depth from the inner chamber of the axial cylinder to the end surface of the first base plate is sufficiently large, so the knot of the lace will not protrude from the end surface of the first base plate, and the knot will not affect the rotation of the spool. In related art, the spool utilizes a guide slope to route and knots the lace outside the opening of the first base plate. The guide slope reduces the depth and area of the inner chamber of the axial cylinder, so the knot of the lace can easily run out of the end surface of the first base plate, causing the knot to get stuck between the spool and the base, resulting in the inability of the spool to rotate freely and smoothly.

According to another aspect, in step S6, the base includes a mounting flange and a retaining wall; the retaining wall is protruded on a surface of the mounting flange, and surrounds the inner chamber of the base; the main part of the tightening device coupled with the lace is provided in the inner chamber of the base; and the first exit and the second exit of the housing are at least partially exposed outside the inner chamber of the base.

According to another aspect, if the end of the tail of the lace is left in the outer region of the housing, step S6 further includes: rotating the rotatable cover in a direction of tightening the lace, such that the tail of the lace located in the outer region of the housing is wound into the groove of the spool.

In the present disclosure, the first exit and the second exit of the housing are at least partially exposed outside the inner chamber of the base. After the lace is pulled back, even if some of the tail of the lace is left in the outer region of the housing, it will still be wound into the groove of the spool as the spool is rotated, without getting stuck between the housing and the inner chamber of the base to make the tightening device fail. Therefore, in the present disclosure, there is no need to make a too strict regulation on the reserved tail when the lace is knotted for the coupling between the lace and the tightening device. The tail of the lace can be sufficiently short to be pulled into the inner chamber of the axial cylinder as the lace is pulled back, or sufficiently long to be pulled into the groove of the spool. Even if the tail of the lace is sufficiently long to be left in the outer region of the housing, the exposed tail can be wound into the groove of the spool for storage by rotating the spool. This does not affect the appearance of the tightening device or the functional implementation thereof. In addition, due to the large allowance of the length of the reserved tail, no tool is needed, and the knot can be completed by a hand alone. Therefore, the knotting process is easy and fast, and the requirement for the technical level of the worker is greatly reduced.

Additional aspects and advantages of the present disclosure will be partly provided in the following description, and partly become evident in the following description or understood through the practice of the present disclosure.

BRIEF DESCRIPTION OF THE DRAWINGS

To describe the technical solutions in the embodiments of the present application or in the prior art more clearly, the following briefly describes the drawings required for describing the embodiments or the prior art. Apparently, the drawings in the following description show some embodiments of the present application, and those of ordinary skill in the art may still derive other drawings from these drawings without creative efforts.

Figure 1:
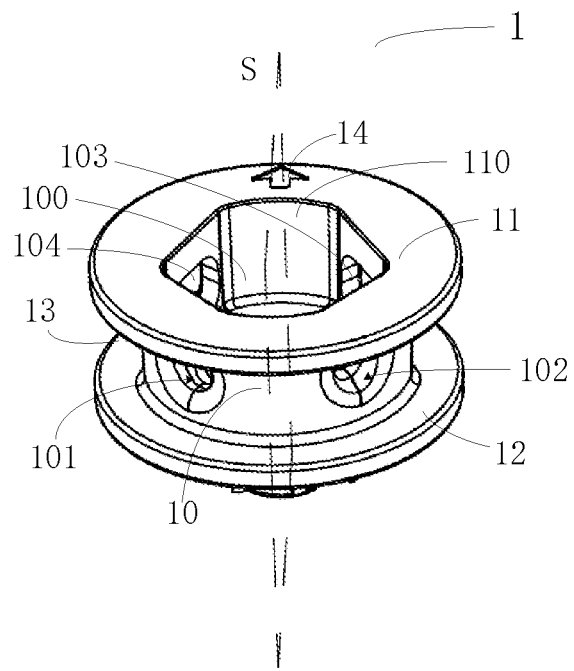
FIG. 1 is a structural diagram of a spool according to an embodiment of the present disclosure.

REFERENCE NUMERALS 1. spool; 10. axial cylinder; 100. inner chamber of axial cylinder; 11. first base plate; 110. opening; 12. second base plate; 120. hole; 122. engaging tooth; 123. elastic stop pin; 13. groove; 14. alignment mark; 101. first lace insertion hole; 102. second lace insertion hole; 103. first lace exit hole; 104. second lace exit hole; 2. base; 21. mounting flange; 22. retaining wall; 20. inner chamber of base; 3. housing; 31. first entrance; 32. second entrance; 33. first exit; 34. second exit; 35. alignment mark; 36. inclined stop; 4. pawl ring; 4'. telescopic swing arm ring; 5 and 5'. rotatable cover; 51 and 51'. retaining ring member; 511. retaining ring; 512. engaging tooth; R1. first routing path; R2. second routing path; T11 and T21. tail of lace; and T12 and T22. knot of lace.

The implementation of the objectives, functional characteristics and advantages of the present disclosure will be further described below with reference to the embodiments and the drawings.

DETAILED DESCRIPTION OF THE EMBODIMENTS

The embodiments of the present disclosure are described below in detail. Examples of the embodiments are shown in the drawings. The same or similar numerals represent the same or similar elements or elements having the same or similar functions throughout the specification. The embodiments described below with reference to the drawings are illustrative, which are merely intended to explain the present disclosure, rather than to limit the present disclosure. All other embodiments obtained by those of ordinary skill in the art based on the embodiments of the present application without creative efforts shall fall within the protection scope of the present application.

It should be understood that, in the description of the present disclosure, the terms, such as "central", "longitudinal", "transverse", "long", "wide", "thick", "upper", "lower", "front", "back", "left", "right", "vertical", "horizontal", "top", "bottom", "inner", "outer", "clockwise", "anticlockwise", "axial", "peripheral", and "radial", are intended to indicate orientations shown in the drawings. It should be noted that these terms are merely intended to facilitate a simple description of the present disclosure, rather than to indicate or imply that the mentioned apparatus or elements must have the specific orientation or be constructed and operated in the specific orientation. Therefore, these terms may not be construed as a limitation to the present disclosure.

In addition, the terms "first" and "second" are merely intended for a purpose of description, and shall not be understood as an indication or implication of relative importance or implicit indication of a quantity of indicated technical features. Thus, features defined with "first" and "second" may explicitly or implicitly include one or more of the features. In the description of the present disclosure, the phrase "a plurality of" means two or more, unless otherwise specifically defined.

In the present disclosure, unless otherwise clearly specified and defined, meanings of terms "install", "connect with", "connect to" and "fixed to" should be understood in a broad sense. For example, the connection may be a fixed connection, a removable connection, or an integral connection; may be a mechanical connection or an electrical connection; may be a direct connection or an indirect connection via a medium; or may be intercommunication between two components. Those of ordinary skill in the art may understand specific meanings of the above terms in the present disclosure based on a specific situation.

In the present disclosure, unless otherwise expressly specified, when it is described that a first feature is "above" or "under" a second feature, it may indicate that the first feature is in direct contact with the second feature, or that the first feature and the second feature are not in direct contact with each other but are in contact via another feature between them. In addition, that the first feature is "over", "above", and "on" the second feature includes that the first feature is directly above and diagonally above the second feature, or simply indicates that a horizontal height of the first feature is larger than that of the second feature. "A first feature is under and below a second feature" includes "the first feature is directly under or obliquely under the second feature" or simply means that "the first feature is lower than the second feature".

The present disclosure provides a novel spool structure and a coupling method of the spool and a lace. The embodiments of the present disclosure are described in detail below with reference to the drawings.

Embodiment 1

Referring to FIG. 1, the embodiment of the present disclosure provides spool 1 for coupling and winding a lace. The spool includes axial cylinder 10, and first base plate 11 and second base plate 12 located at two opposite ends of the axial cylinder. The first base plate 11 and the second base plate 12 are parallel to each other, and extend radially outward relative to the axial cylinder 10. An outer region of the axial cylinder 10 between the first base plate 11 and the second base plate 13 forms groove 13 for winding the lace.

Figure 2:
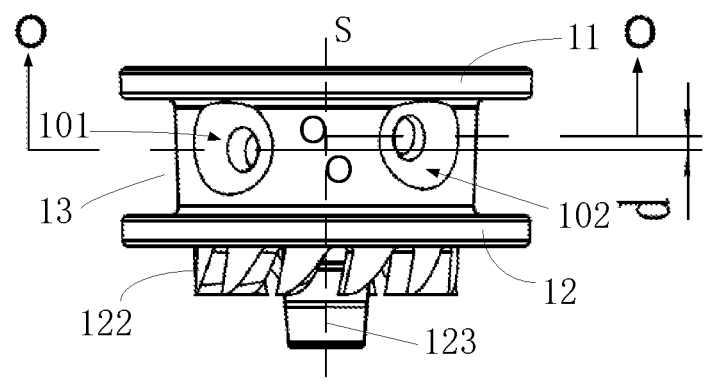
FIG. 2 is a front view of the spool shown in FIG. 1.
Figure 3:
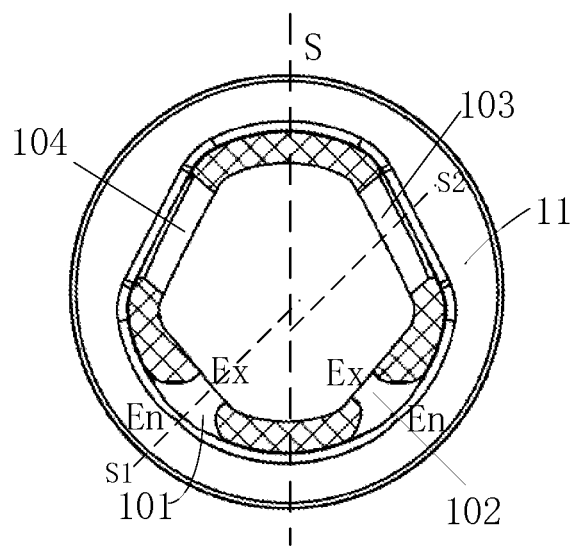
FIG. 3 is a section view of the spool along direction O-O shown in FIG. 2.
Figure 4:
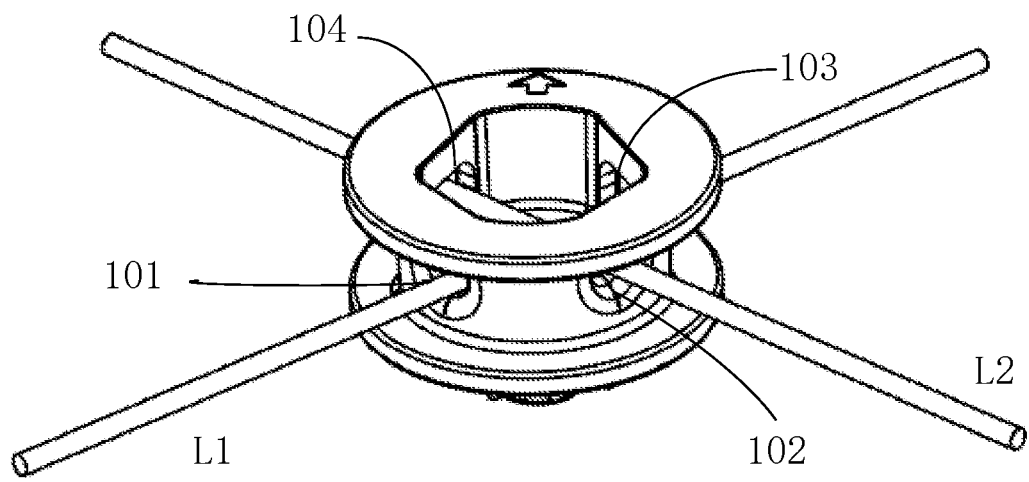
FIG. 4 is a schematic diagram of a routing state of a coupling process of the spool shown in FIG. 1 and a lace.
Figure 9:
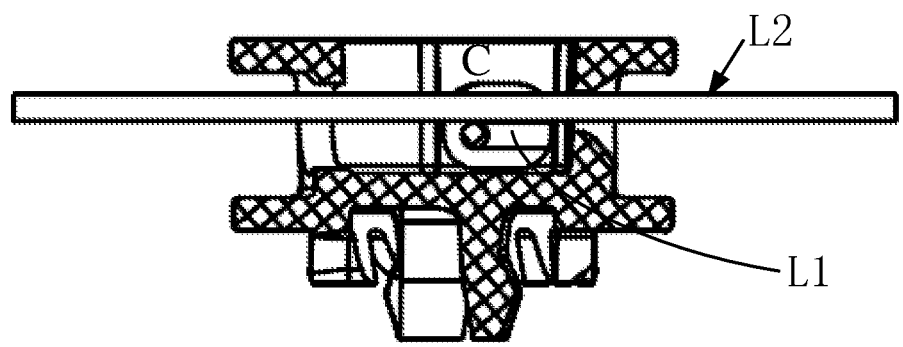
FIG. 9 is a section view of the routing state, shown in FIG. 5, along direction J-J.

As shown in FIGS. 1 to 3, the axial cylinder 10 is provided with inner chamber 100. A side wall of the axial cylinder 10 is provided with first lace insertion hole 101, second lace insertion hole 102, first lace exit hole 103, and second lace exit hole 104. Based on a reference plane defined by symmetry plane S of the axial cylinder 10, the first lace insertion hole 101 and the first lace exit hole 103 are located on two opposite sides of the axial cylinder 10 (i.e. on two sides of the reference plane S), and the second lace insertion hole 102 and the second lace exit hole 104 are also located on two opposite sides of the axial cylinder 10. Further, as shown in FIGS. 2 and 3, the first lace insertion hole 101 and the second lace insertion hole 102 are arranged at different axial heights of the axial cylinder, and a difference between central axial heights of the first lace insertion hole 101 and the second lace insertion hole 102 is denoted as d. Further, a projection line of central axis S1 of the first lace insertion hole 101 and a projection line of central axis S2 of the first lace exit hole 103 on a plane of the first base plate 11 are parallel to each other, making it possible to route in subtended directions. Even if first free end L1 and second free end L2 of the lace are routing simultaneously, routing on first routing path R1 and routing on second routing path R2 can still be performed freely in space without colliding with each other, presenting a separate grade crossing state as shown in FIGS. 4 and 9. Each of the first lace insertion hole 101 and the second lace insertion hole 102 is provided with a trumpet-shaped structure, and each of the first lace insertion hole 101 and the second lace insertion hole 102 includes entry end En and exit end Ex smaller than the entry end En in terms of size.

Referring to FIGS. 4 to 9, a coupling method of the lace and the spool includes the following steps.

S1. The spool is placed in a direction shown in FIG. 1. That is, the first base plate 11 is located on a top side, the first lace insertion hole 101 and the second lace insertion hole 102 are located on a front side, and the first lace exit hole 103 and the second lace exit hole 104 are located on a back side.

Figure 5:
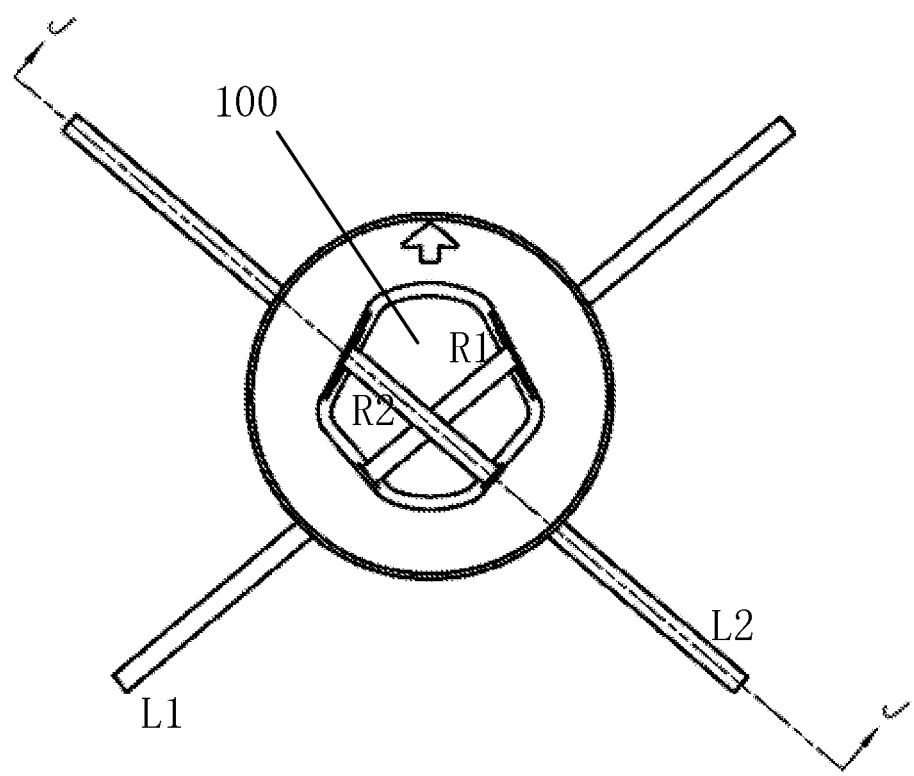
FIG. 5 is a top view of the routing state shown in FIG. 4.

S2. The lace is provided. As shown in FIGS. 4 and 5, the lace includes first free end L1 and second free end L2. The first free end L1 enters the inner chamber 100 of the axial cylinder 10 from the first lace insertion hole 101, travels along the first routing path R1 to reach the first lace exit hole 103, and exits to the outer region of the axial cylinder. The second free end L2 enters the inner chamber 100 of the axial cylinder 10 from the second lace insertion hole 102, travels along the second routing path R2 to the second lace exit hole 104, and exits to the outer region of the axial cylinder. The first routing path R1 and the second routing path R2 are designed in separate grade crossing structure. As shown in FIG. 9, there is a slight distance difference between the second free end L2 and the first free end L1 of the lace at grade crossing point C of the routing path R1 and the routing path R2. Of course, in other embodiments, a lower edge of the second free end L2 and an upper edge of the first free end L1 may also have zero-distance contact at the grade crossing point C.

Figure 6:
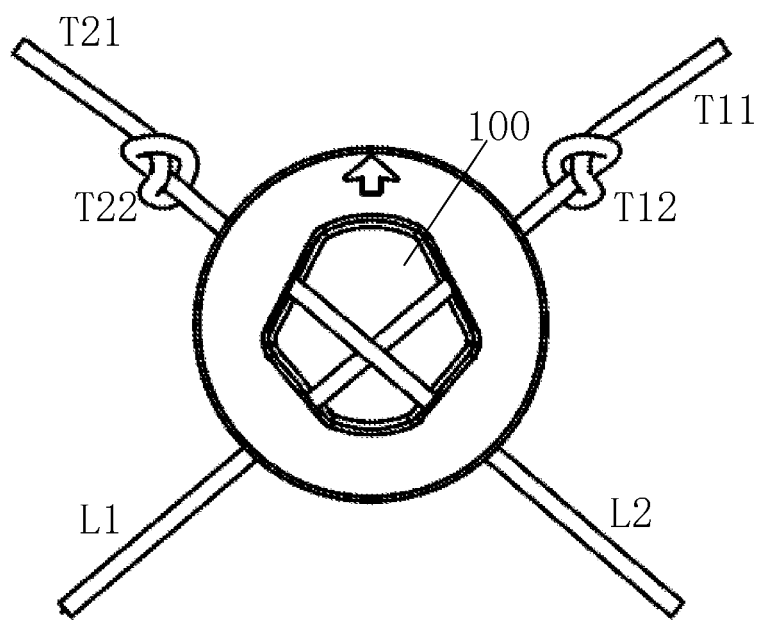
FIG. 6 is a top view of knotting of the coupling process of the spool shown in FIG. 1 and the lace.

S3. Referring to FIG. 6, the first free end L1 and the second free end L2 located in the outer region of the axial cylinder are knotted. After knotting, the first free end includes tail T11 and knot T12, and the second free end includes tail T21 and knot T22.

S4. The lace is pulled back, such that at least the knot T12 and the knot T22 are pulled back into the inner chamber 100 of the axial cylinder, and the lace is coupled with the spool 1. According to another aspect, the size of the exit end Ex of the lace insertion hole is less than or equal to the size of the knot T12 or the knot T22. In this way, the knot T12 or the knot T22 pulled into the inner chamber of the axial cylinder is stuck at the exit end Ex of the lace insertion hole, so as to fix the lace. Step S4 includes the following two operations.

Figure 7:
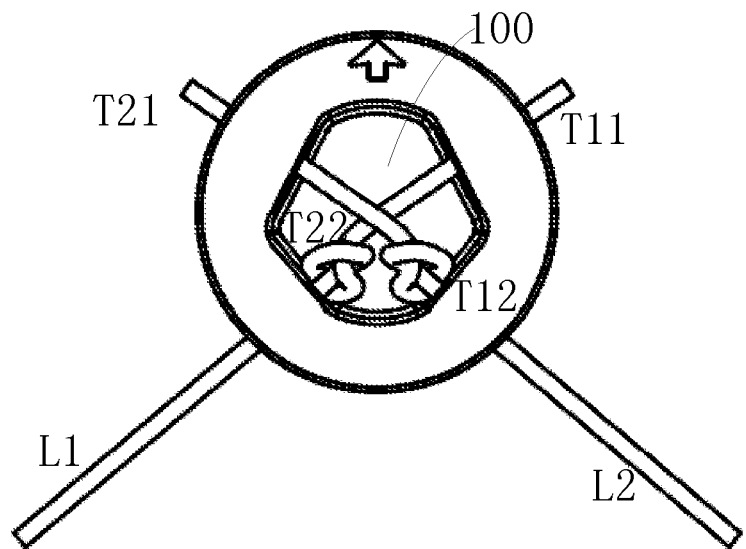
FIG. 7 is a top view of the spool, shown in FIG. 1, coupled with the lace according to an embodiment of the present disclosure.

S41. The lace is pulled back, such that the knot T12 and the knot T22 are pulled back into the inner chamber 100 of the axial cylinder, while an end of the tail T11 and an end of the tail T21 are remained in the outer region of the axial cylinder, as shown in FIG. 7.

Figure 8:
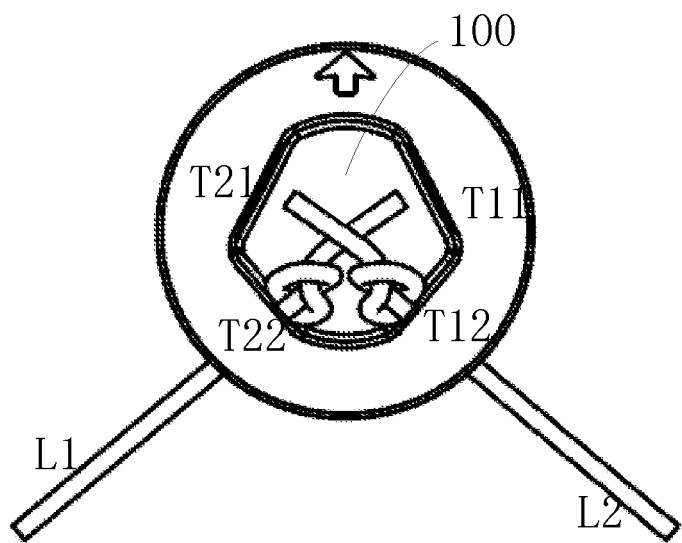
FIG. 8 is a top view of the spool, shown in FIG. 1, coupled with the lace according to another embodiment of the present disclosure.

S42. The lace is pulled back, such that the knot T12, the knot T22, the end of the tail T11, and the end of the tail T21 are pulled back into the inner chamber 100 of the axial cylinder, as shown in FIG. 8.

Figure 10:
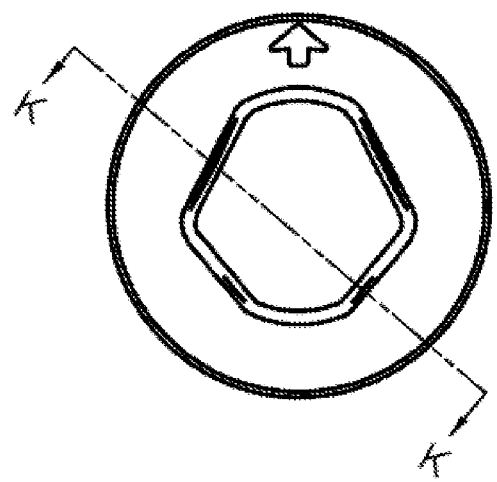
FIG. 10 is a top view of the spool shown in FIG. 1.
Figure 11:
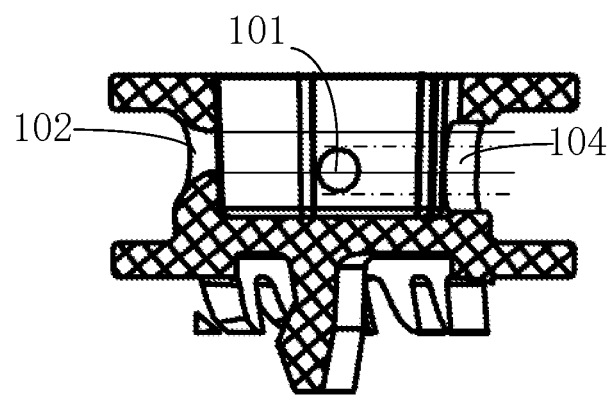
FIG. 11 is a section view of the spool along direction K-K shown in FIG. 10.
Figure 12:
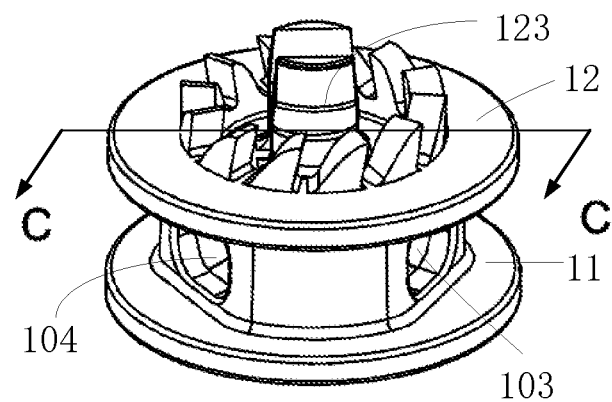
FIG. 12 is a stereoscopic view of the spool, shown in FIG. 1, after being flipped over.
Figure 13:
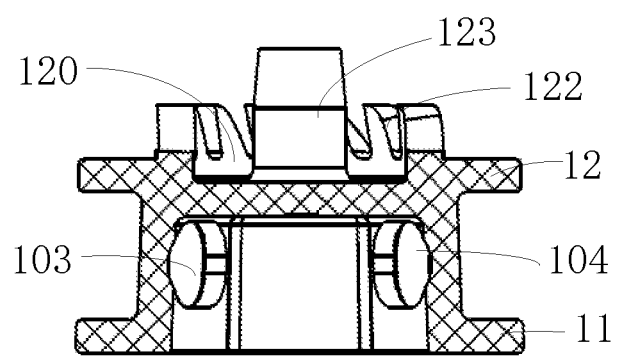
FIG. 13 is a section view of the spool along direction C-C shown in FIG. 12.

In addition, when the first end L1 and the second end L2 are routing in subtended directions along the first routing path R1 and second routing path R2, ideally, the central axis of the first lace insertion hole 101 is collinear with the central axis of the first lace insertion hole 103, and the central axis of the second lace insertion hole 102 is collinear with the central axis of the second lace insertion hole 104. In this structure, the lace insertion hole is strictly aligned with the subtended lace exit hole. However, this requires the first lace exit hole and the second lace exit hole to be located at different axial heights of the axial cylinder, which is complex during processing and forming. Therefore, for the convenience of processing and forming, the lace enters the inner chamber of the axial cylinder from the first lace insertion hole 101 and reaches a space of the first lace exit hole 103 along an established straight path, and the lace enters the inner chamber of the axial cylinder from the second lace insertion hole 102 and reaches a space of the second lace exit hole 104 along an established straight path. The established straight path indicates the direction of the lace in the corresponding lace insertion hole. This structure does not require strict alignment between the lace exit hole and the corresponding lace insertion hole of the spool, making it easy for processing and forming. Specifically, FIGS. 10 and 11 show positional relationships of the first lace insertion hole 101, the second lace insertion hole 102, the first lace exit hole 103 (not shown in the figure), and the second lace exit hole 104. The exit end Ex of the first lace insertion hole 101 includes an uppermost edge not higher than an uppermost edge of the first lace insertion hole 103 (not shown in the figure) and a lowermost edge not lower than a lowermost edge of the first lace insertion hole 103 (not shown in the figure). The exit end Ex of the second lace insertion hole 102 includes an uppermost edge not higher than an uppermost edge of the second lace insertion hole 104 and a lowermost edge not lower than a lowermost edge of the second lace insertion hole 104. In this way, any free end entering the inner chamber 100 of the axial cylinder 10 from the first lace insertion hole 101 and the second lace insertion hole 102 can reach the space of the subtended lace insertion hole in a straight line. In order to facilitate processing and forming, according to another aspect, the sizes of the first lace exit hole 103 or the second lace exit hole 104 is larger than the size of the first lace exit hole 101 or the second lace exit hole 102. As shown in FIG. 11, in this embodiment, the axial height of the first lace exit hole 103 or the second lace exit hole 104 is substantially equal to the axial height of the groove 13. The uppermost edge and the lowermost edge of the exit end Ex of each lace insertion hole are located in the corresponding region of the lace exit hole, which is convenient for forming. The first lace exit hole 103 and the second lace exit hole 104 are sufficiently large to facilitate the smooth pulling of the knots into the inner chamber of the axial cylinder. According to another aspect, as shown in FIGS. 12 and 13, in this embodiment, the first lace exit hole 103 and the second lace exit hole 104 are symmetrically arranged about the symmetry plane S of the axial cylinder 10. That is, the two lace exit holes have the same size and shape (rounded rectangle).

Further, as shown in FIG. 1, the first base plate 11 includes opening 110. The opening 110 is communicated with the inner chamber 100 of the axial cylinder 10, allowing the entire inner chamber 100 to open to the outer region. According to another aspect, in Step S2 of the coupling method of the lace and the spool, the routing of the first free end L1 and the second free end L2 in the inner chamber 100 of the axial cylinder is observed through the opening 110, so as to improve the routing accuracy.

As shown in FIGS. 12 and 13, a center of the second base plate 12 is provided with cylindrical hole 120. Elastic stop pin 123 is provided on a bottom surface of the hole. The elastic stop pin 123 extends towards the outer region of the spool. An end surface of the second base plate 12 is provided with engaging teeth 122 surrounding the hole 120. A bottom surface of the inner chamber of the axial cylinder 10 is connected to the bottom surface of the hole 120.

Referring to FIG. 1, the spool is further provided with alignment mark 14, and the alignment mark 14 is preferably an arrow.

Embodiment 2

Figure 14:
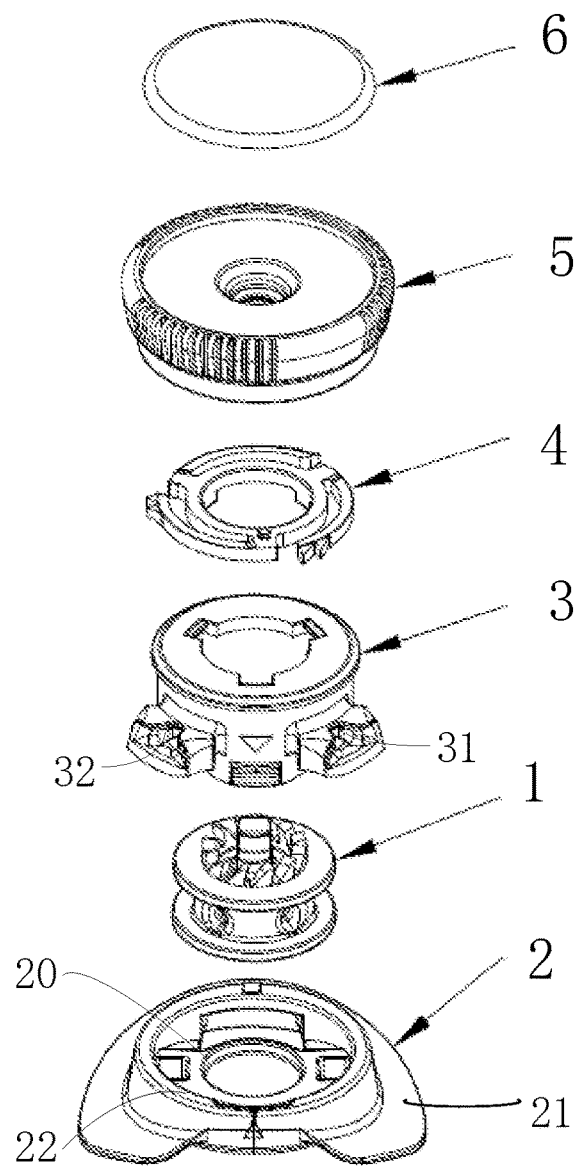
FIG. 14 is an exploded view of a tightening device with a spool according to the present disclosure.

This embodiment provides a tightening device based on the spool shown in Embodiment 1. As shown in FIG. 14, the tightening device includes base 2, spool 1, housing 3, pawl ring 4, rotatable cover 5, and decorative element 6. The structure of the spool 1 is the same as the structure of the spool 1 in Embodiment 1. The decorative element 6 is provided on a surface of the rotatable cover 5. For the connection method between the spool 1 and the rotatable cover 5, the connection method between the rotatable cover 5 and the housing 3, the structure of the pawl ring 4, and the connection method between the pawl ring and the housing 3, please refer to the content of Chinese Patent Application CN208993976U.

Figure 16:
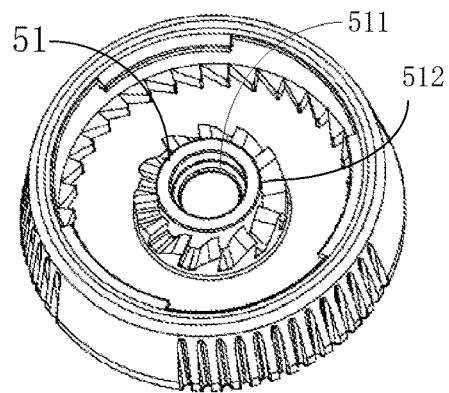
FIG. 16 is a structural diagram of a rotatable cover of the tightening device, shown in FIG. 14, after being flipped over.

As shown in FIG. 16, the rotatable cover 5 is further provided with integrally formed retaining ring member 51. The retaining ring member 51 is matched with the elastic stop pin 123 of the spool 1 to form a position switching mechanism of the tightening device. A center of the retaining ring member 51 is provided with a hollow post. An inner wall of the hollow post is provided with retaining ring 511. The retaining ring 511 is matched with the elastic stop pin 123 of the spool 1 to achieve a position switching function of the tightening device. The retaining ring member 51 is further provided with a ring of engaging teeth 512 surrounding the hollow post and corresponding to the engaging teeth 122. The rotatable cover 5 is detachably connected to the spool 1 through the engaging teeth. When the engaging teeth engage, the rotatable cover 5 can be rotated to drive the spool 1 to rotate.

Figure 17:
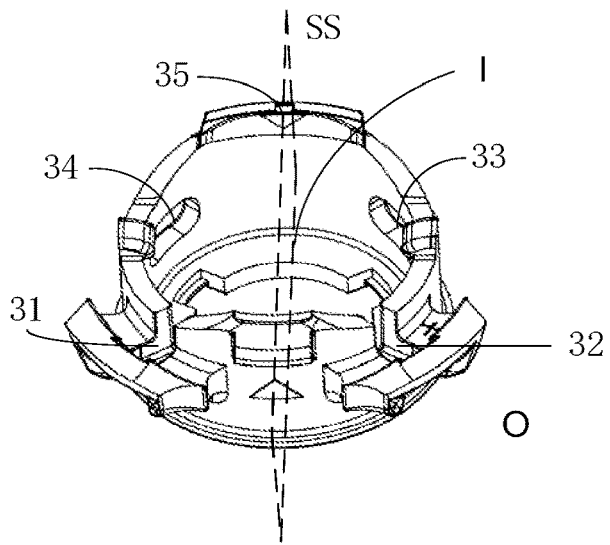
FIG. 17 is a schematic diagram of a housing of the tightening device, shown in FIG. 14, after being flipped over.

Further, referring to FIG. 17, the housing 3 is provided with an inner region I. The spool 1 is rotatably provided in the inner region I. The housing 3 includes first entrance 31 and second entrance 32, which are arranged opposite to each other and configured to introduce the lace from the outer region O of the housing 3 into the inner region I. Each of the first entrance 31 and the second entrance 32 is provided with a lug structure, and the first entrance 31 and the second entrance 32 are symmetrically arranged with each other. The housing 3 is further provided with first exit 33 and second exit 34, which are configured to introduce the lace from the inner region I of the housing 3 to the outer region O. As shown in FIG. 17, based on a reference plane defined by symmetry plane SS of the housing 3, the first entrance 31 and the first exit 33 are located on two opposite sides of the housing (i.e. on two sides of the reference plane SS), and the second entrance 32 and second exit 34 are located on two opposite sides of the housing. The housing 3 is further provided with alignment mark 35, which is matched with the alignment mark 14 of the spool 1 to indicate an alignment position of the housing 3 with the spool 1.

In this embodiment, the coupling method of the tightening device and the lace includes the following steps.

Figure 18:
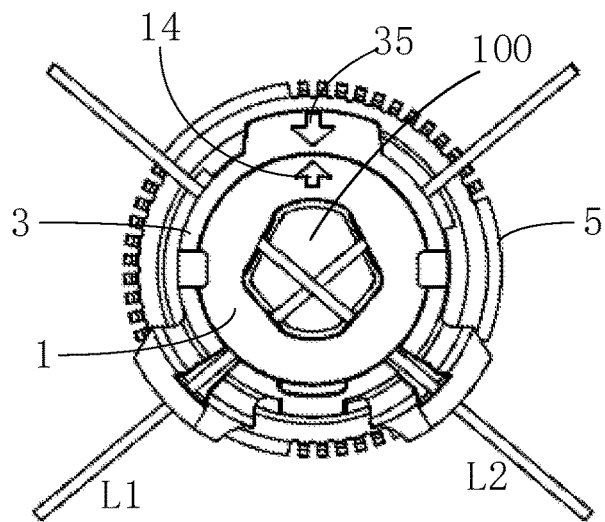
FIG. 18 is a top view of a routing state of a coupling process of a lace and the tightening device shown in FIG. 14, with a base removed.

S1. A main part of the tightening device is assembled. The housing 3, the pawl ring 4, and the rotatable cover 5 are assembled together in the manner mentioned above. Then, the assembled structure is flipped over. The housing 3 is placed as shown in FIG. 18, with a bottom surface of the housing 3 facing upwards, and the spool 1 is provided in the inner region I of the housing 3.

Figure 19:
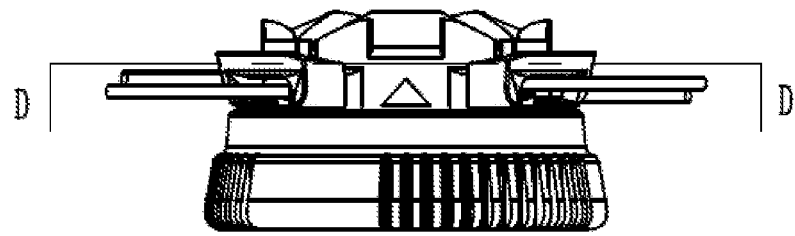
FIG. 19 is a front view of the routing state shown in FIG. 18.
Figure 20:
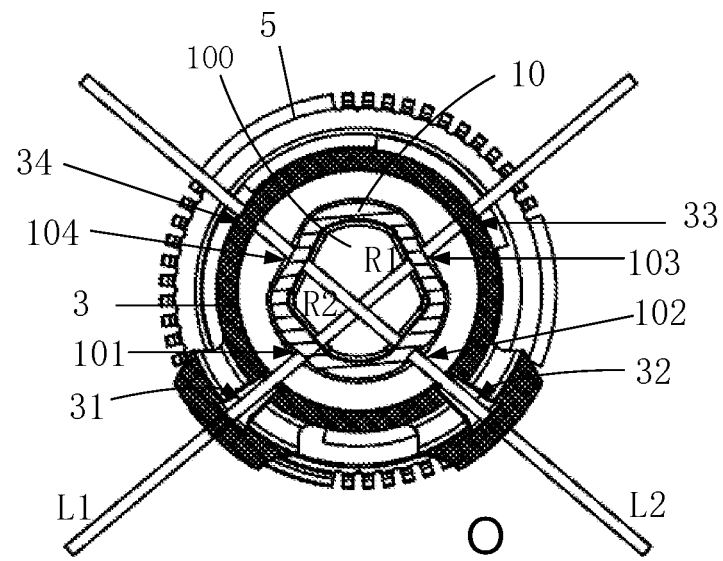
FIG. 20 is a section view of the routing state along direction D-D shown in FIG. 19.

S2. The spool 1 is rotated to align the alignment mark 14 with the alignment mark 35 of the housing. As shown in FIGS. 18 to 20, the first lace insertion hole 101 of the spool is aligned with the first entrance 31 of the housing, and the second lace insertion hole 102 of the spool is aligned with the second entrance 32 of the housing. The first lace exit hole 103 of the spool is aligned with the first exit 33 of the housing, and the second lace exit hole 104 of the spool is aligned with the second exit 34 of the housing.

S3. The lace is provided. The lace includes the first free end L1 and the second free end L2, as shown in FIG. 20. The first free end L1 enters the inner chamber 100 of the axial cylinder 10 from the first entrance 31 and the first lace insertion hole 101, travels along the first routing path R1 to the first lace exit hole 103, and exits from the first exit 33 to the outer region O of the housing. The second free end L2 enters the inner chamber of the axial cylinder 10 from the second entrance 32 and the second lace insertion hole 102, travels along the second routing path R2 to the second lace exit hole 104, and exits from the second exit 34 to the outer region O of the housing. The first routing path R1 and the second routing path R2 are designed in separate grade crossing structure.

Figure 21:
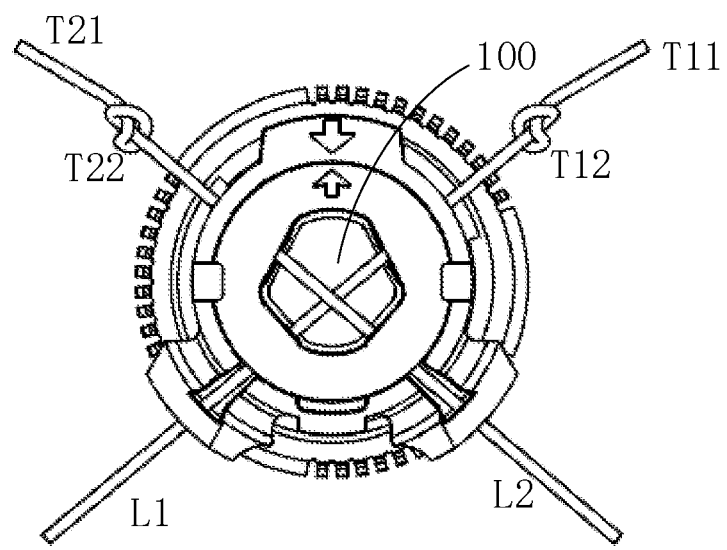
FIG. 21 is a top view of knotting of the coupling process of the lace and the tightening device shown in FIG. 14, with the base removed.

S4. Referring to FIG. 21, the first free end L1 and the second free end L2 in the outer region O of the housing are knotted. After tightening, the first free end includes the tail T11 and the knot T12, and the second free end includes the tail T21 and the knot T22.

Figure 22:
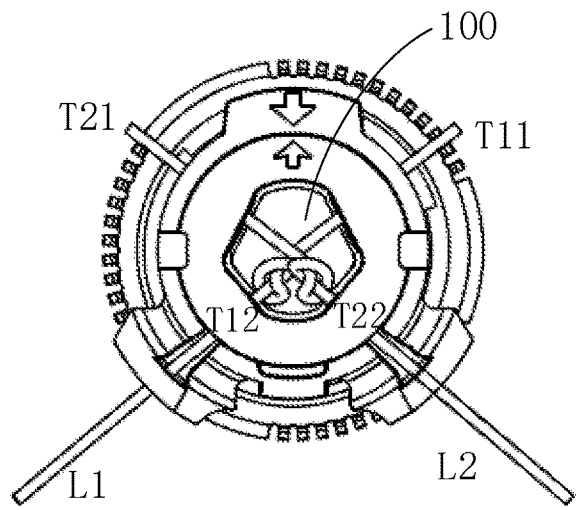
FIG. 22 is a top view of coupling of the lace and the tightening device shown in FIG. 14, with the base removed, according to a first embodiment.
Figure 23:
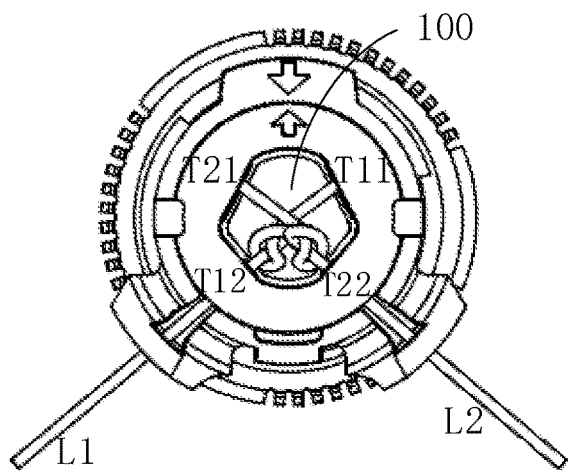
FIG. 23 is a top view of coupling of the lace and the tightening device shown in FIG. 14, with the base removed, according to a second embodiment.
Figure 24:
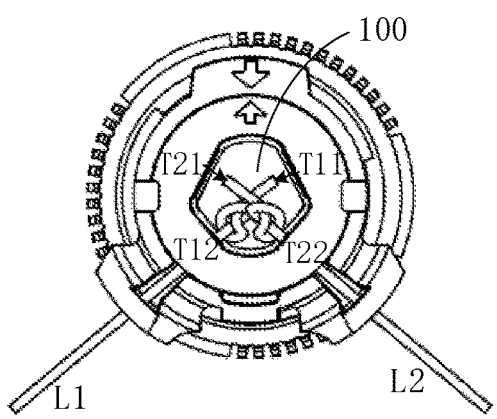
FIG. 24 is a top view of coupling of the lace and the tightening device shown in FIG. 14, with the base removed, according to a third embodiment.

S5. Referring to FIGS. 22 to 24, the lace is pulled back, such that at least the knot T12 and the knot T22 are pulled back into the inner chamber 100 of the axial cylinder, and the lace is coupled to the main part of the tightening device. Step S5 includes the following three operations.

S51. Referring to FIG. 22, the lace is pulled back, such that the knot T12 and the knot T22 are pulled back into the inner chamber 100 of the axial cylinder and the end of the tail T11 and the end of the T21 are located in the outer region of the housing.

S52. Referring to FIG. 23, the lace is pulled back, such that the knot T12 and the knot T22 are pulled back into the inner chamber 100 of the axial cylinder, and the end of the tail T11 and the end of the tail T21 are located in both the inner region of the housing and the outer region of the axial cylinder. That is, the end of the tail T11 and the end of the tail T21 are located in the groove of the spool.

S53. Referring to FIG. 24, the lace is pulled back, such that the knot T12, the knot T22, the end of the tail T11, and the end of the tail T21 are pulled back into the inner chamber 100 of the axial cylinder.

S6. The main part of the tightening device coupled with the lace is flipped over, and provide in an inner chamber of the base 2. Specifically, referring to FIG. 14, the base 2 includes mounting flange 21 and retaining wall 22. The retaining wall 22 is protruded on a surface of the mounting flange 21 and surrounds the inner chamber 20 of the base 2. A side of the first base plate of the spool 1 coupled with the lace faces the base 2, and an end of the housing 3 away from the rotatable cover is provided in the inner chamber 20 of the base 2. In this way, the assembly of the entire tightening device is completed.

Figure 15:
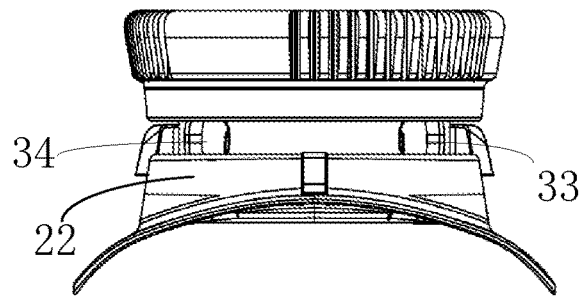
FIG. 15 is a rear view of the tightening device, shown in FIG. 14, after being assembled.

A rear structure of the assembled tightening device is shown in FIG. 15. The first exit 33 and the second exit 34 of the housing 3 are at least partially exposed outside the inner chamber of the base and above the retaining wall 22. Regarding the other components of the base 2 and the connection between the components and the housing 3, please refer to Chinese Patent Application CN217524127U. The base 2 may be pre-fixed to a target item. When the main part of the tightening device is coupled with the lace, the main part of the tightening device is provided in the inner chamber of the base. The base 2 may be fixed to a vamp, tongue or a heel of a shoe, clothing, or a bag. In addition, since the first exit 33 and second exit 34 of the housing 3 are at least partially exposed outside the inner chamber of the base and above the retaining wall 22, even if the main part of the tightening device is pre-fixed in the inner chamber of the base 2, the lace and the tightening device can still be coupled. Through this structure, the lace can be replaced without removing the tightening device.

In this embodiment, the axial heights of the first entrance 31 and the second entrance 32 of the housing 3 are relatively large. At least a portion of the first lace insertion hole 101 of the spool 1 is located in an open region of the first entrance 31 of the housing 3, and at least a portion of the second lace insertion hole 102 of the spool 1 is located in an open region of the second entrance 32 of the housing 3. Therefore, when the housing 3 and the spool 1 are in respective alignment positions, subtended routing can be performed.

When the rotatable cover is pressed, the tightening device is in a first position, and the rotatable cover is connected to the spool. When the rotatable cover is rotated in a direction of tightening the lace, the spool is driven to rotate in the tightening direction. Even if the end of the tail of the lace is located in the outer region of the housing, as the spool is rotated, the exposed tail of the lace will be wound into the groove of the spool, so the entire lace will be wound into the groove of the spool. When the rotatable cover is pulled, the tightening device is in a second position. The rotatable cover is disengaged from the spool, allowing the spool to rotate freely. Therefore, the lace can be loosened by pulling.

In this embodiment, the first free end L1 and second free end L2 of the lace can be two free ends from one lace or two laces. That is, the first free end L1 and second free end L2 of the lace can be two free ends of one lace. Or, the first free end L1 can be one free end of a first lace and the second free end L2 can be one free end of a second lace.

Figure 25:
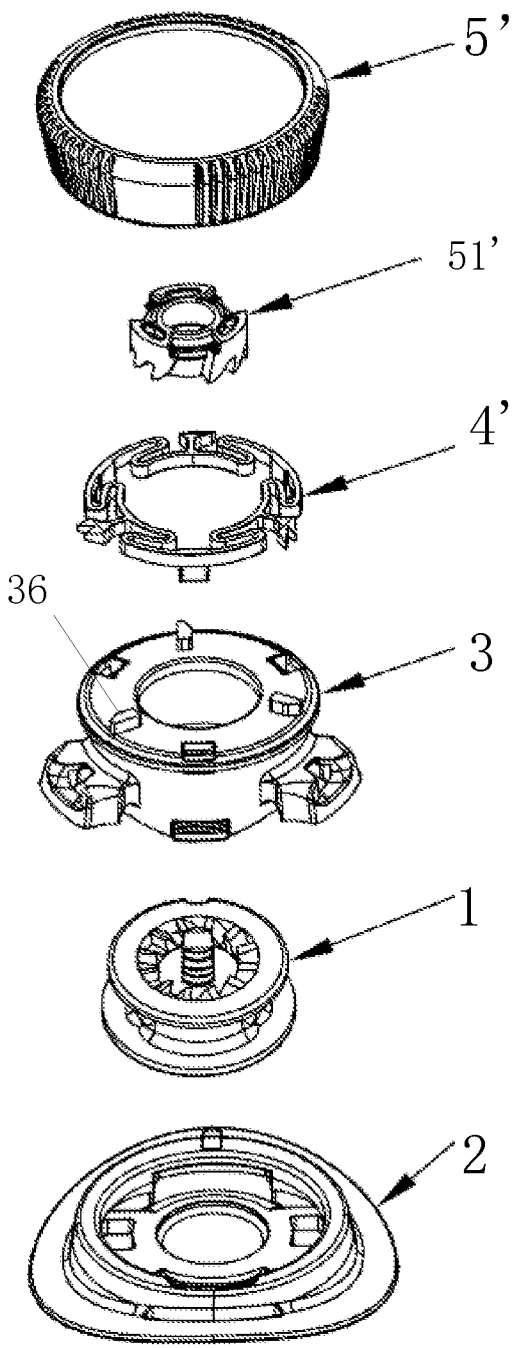
FIG. 25 is an exploded view of another tightening device with a spool according to the present disclosure.

In this embodiment, a commonly used pawl and ratchet is used as a non-return mechanism, or a structure including a groove, a telescopic swing arm ring, and an inclined stop is used as a non-return mechanism, as shown in FIG. 25. Telescopic swing arm ring 4' is fixed on the housing 3 through a buckle structure, and inclined stop 36 is integrally formed on the housing 3. Specifically, the structure and non-return mechanism of the telescopic swing arm ring and the inclined stop can be referred to Chinese Patent Application CN216723374U. In addition, the tightening device shown in FIG. 25 differs from the tightening device shown in FIG. 14. The retaining ring member 51' and the rotatable cover are manufactured separately and connected together by the buckle structure. The retaining ring member 51' also includes a retaining ring and engaging teeth, and the detachable connection between the spool and the rotatable cover is achieved through the engaging teeth.

In other embodiments, the non-return mechanism can adopt a structure including a groove, an elastic pin rod assembly, and an anti-deflection member provided by Chinese Patent Application CN216256587U, and a structure including a swing arm, a groove, and a stop provided by Chinese Patent Application CN215837385. That is, the spool structure is suitable for all tightening devices that use an elastic stop pin as a position switching mechanism.

In this embodiment, the target item to be tightened may be a shoe, clothing, a hat, a bag, or it may be a bag of any type. The target item to be tightened is provided with a tightening device, which tightens the lace so as to close an opening. The tightening device can achieve all the technical effects of the tightening device described above, and they will not be repeated herein.

In descriptions in this specification, descriptions about such reference terms as "an embodiment", "some embodiments", "an example", "a specific example", and "some examples" mean that specific features, structures, materials, or characteristics described with reference to the embodiments or examples are included in at least one embodiment or example of the present disclosure. In this specification, schematic representation of the above terms is not necessarily directed to the same embodiment or example. Moreover, the specific features, structures, materials or characteristics described may be combined in a suitable manner in any one or more embodiments or examples. In addition, those skilled in the art may combine different embodiments or examples described in this specification and characteristics of the different embodiments or examples without mutual contradiction.

The foregoing are merely preferred embodiments of the present disclosure, and the scope of the present disclosure is not limited thereto. Any equivalent structure change made using the content of the specification of the present disclosure and the drawings under the inventive concept of the present disclosure, or direct/indirect application thereof in other related technical fields, shall fall within the protection scope of the present disclosure.

What is claimed is:

1. A spool, configured to be coupled with and wind a lace, and comprising an axial cylinder, a first base plate and a second base plate, wherein the first base plate and the second base plate are located at opposite ends of the axial cylinder, and an outer region of the axial cylinder between the first base plate and the second base plate forms a groove for winding the lace; wherein the axial cylinder is provided with an inner chamber; a side wall of the axial cylinder is provided with a first lace insertion hole, a second lace insertion hole, a first lace exit hole, and a second lace exit hole; the first lace insertion hole and the first lace exit hole are located on opposite sides of the axial cylinder; and the second lace insertion hole and the second lace exit hole are located on opposite sides of the axial cylinder; and the first lace insertion hole, the inner chamber of the axial cylinder, and the first lace exit hole form a first routing path; the second lace insertion hole, the inner chamber of the axial cylinder, and the second lace exit hole form a second routing path; and the first routing path and the second routing path are designed in separate grade crossing structure; wherein a center of the first lace insertion hole and a center of the second lace insertion hole are located at different axial heights of the axial cylinder, the first base plate comprises an opening communicated with the inner chamber of the axial cylinder, the lace passing through the first routing path and the second routing path is allowed to be seen from an outside through the opening of the first base plate and the inner chamber of the axial cylinder, wherein the lace comprises a first free end and a second free end, wherein the first free end comprises a first knot after knotting and the second free end comprises a second knot after knotting, wherein the lace is coupled to the spool via the first knot and the second knot, and the first knot and the second knot are stored in the inner chamber of the axial cylinder.

2. The spool according to claim 1, wherein each of the first lace insertion hole and the second lace insertion hole comprises an entry end and an exit end; and a size of the exit end is smaller than a size of the entry end.

3. The spool according to claim 1, wherein the first routing path and the second routing path are parallel to the first base plate or the second base plate.

4. The spool according to claim 1, wherein the first routing path and the second routing path are both subtended paths.

5. The spool according to claim 1, wherein a size of the first lace exit hole is larger than a size of the first lace insertion hole; and a size of the second lace exit hole is larger than a size of the second lace insertion hole.

6. A tightening device with a spool, comprising:
a housing, provided with an inner region;
a rotable cover, rotatably connected to the housing; and
the spool, configured to be coupled with and wind a lace, the spool positioned in the inner region of the housing and rotatable relative thereto, wherein the spool comprises an axial cylinder, a first base plate and a second base plate, the first base plate and the second base plate are located at opposite ends of the axial cylinder, and an outer region of the axial cylinder between the first base plate and the second base plate forms a groove for winding the lace; wherein
the housing is further provided with a first entrance and a second entrance for the lace to enter the inner region of the housing from an outer region of the housing; the housing is further provided with a first exit and a second exit for the lace to exit from the inner region of the housing to the outer region of the housing; the first entrance and the first exit are located on opposite sides of the housing; and the second entrance and the second exit are located on opposite sides of the housing;
the axial cylinder is provided with an inner chamber; a side wall of the axial cylinder is provided with a first lace insertion hole, a second lace insertion hole, a first lace exit hole, and a second lace exit hole; the first lace insertion hole and the first lace exit hole are located on opposite sides of the axial cylinder; and the second lace insertion hole and the second lace exit hole are located on opposite sides of the axial cylinder, wherein a center of the first lace insertion hole and a center of the second lace insertion hole are located at different axial heights of the axial cylinder; the first base plate comprises an opening communicated with the inner chamber of the axial cylinder; and when the spool is rotated to an alignment position with the housing, the first entrance of the housing, the first lace insertion hole of the spool, the inner chamber of the axial cylinder, the first lace exit hole of the spool, and the first exit of the housing form a first routing path of the tightening device; the second entrance of the housing, the second lace insertion hole of the spool, the inner chamber of the axial cylinder, the second lace exit hole of the spool, and the second exit of the housing form a second routing path of the tightening device; and the first routing path and the second routing path of the tightening device are designed in separate grade crossing structure; the lace passing through the first routing path and the second routing path is allowed to be seen from an outside through the opening of the first base plate and the inner chamber of the axial cylinder, wherein the lace comprises a first free end and a second free end, wherein the first free end comprises a first knot after knotting and the second free end comprises a second knot after knotting, wherein the lace is coupled to the spool via the first knot and the second knot, and the first knot and the second knot are stored in the inner chamber of the axial cylinder.

7. The tightening device according to claim 6, wherein the first lace exit hole and the second lace exit hole of the spool are symmetrically arranged.

8. The tightening device according to claim 6, wherein a stop pin is provided on an end surface of the second base plate of the spool; the rotable cover is provided with a retaining ring member; the retaining ring member and the rotable cover are formed integrally, or the retaining ring member and the rotable cover are formed separately and connected together; and the retaining ring member is matched with the stop pin to form a position switching mechanism of the tightening device.

9. The tightening device according to claim 6, wherein each of the spool and the housing comprises an alignment mark, wherein through the alignment mark, the first lace insertion hole of the spool is aligned with the first entrance of the housing, the second lace insertion hole of the spool is aligned with the second entrance of the housing, the first lace exit hole of the spool is aligned with the first exit of the housing, and the second lace exit hole of the spool is aligned with the second exit of the housing.

10. The tightening device according to claim 6, further comprising a base, wherein the base is independent of other component of the tightening device and attached to a wearable item.

11. The tightening device according to claim 10, wherein the base comprises an inner chamber; a bottom of the housing is provided in the inner chamber of the base; and the first exit and the second exit of the housing are at least partially exposed outside the inner chamber of the base.

12. A coupling method of a spool and a lace, comprising the following steps:

S1: providing a spool, comprising an axial cylinder, a first base plate and a second base plate, wherein the first base plate and the second base plate are located at opposite ends of the axial cylinder, and an outer region of the axial cylinder between the first base plate and the second base plate forms a groove for winding the lace; the axial cylinder is provided with an inner chamber; a side wall of the axial cylinder is provided with a first lace insertion hole, a second lace insertion hole, a first lace exit hole, and a second lace exit hole; the first lace insertion hole and the first lace exit hole are located on opposite sides of the axial cylinder; and the second lace insertion hole and the second lace exit hole are located on opposite sides of the axial cylinder; a center of the first lace insertion hole and a center of the second lace insertion hole are located at different axial heights of the axial cylinder; and the first base plate comprises an opening communicated with the inner chamber of the axial cylinder;

S2: providing the lace, comprising a first free end and a second free end; allowing the first free end to enter the inner chamber of the axial cylinder from the first lace insertion hole, reach the first lace exit hole along a first routing path, and exit to the outer region of the axial cylinder; and allowing the second free end to enter the inner chamber of the axial cylinder from the second lace insertion hole, reach the second lace exit hole along a second routing path, and exit to the outer region of the axial cylinder, wherein the first routing path and the second routing path are designed in separate grade crossing structure and observing a routing status of the first free end and the second free end in the inner chamber of the axial cylinder through the opening of the first base plate;

S3: knotting the first free end and the second free end at the outer region of the axial cylinder, wherein each of the first free end and the second free end comprises a tail and a knot after knotting; and S4: pulling back the lace, such that at least the knot of the lace is pulled back into the inner chamber of the axial cylinder, and the lace is coupled with the spool.

13. The coupling method of the spool and the lace according to claim 12, wherein in step S2, the first free end and the second free end are two free ends from one lace or two laces.

14. The coupling method of the spool and the lace according to claim 12, wherein each of the first lace insertion hole and the second lace insertion hole comprises an entry end and an exit end; a size of the exit end is smaller than a size of the entry end; and step S4 comprises: pulling back the lace until the knot of the lace is stuck at the exit end of the first lace insertion hole and the second lace insertion hole.

15. The coupling method of the spool and the lace according to claim 12, wherein step S4 comprises: pulling back the lace, such that the knot of the lace is pulled back into the inner chamber of the axial cylinder, while an end of the tail of the lace is left in the outer region of the axial cylinder.

16. The coupling method of the spool and the lace according to claim 12, wherein step S4 comprises: pulling back the lace, such that the knot of the lace and an end of the tail of the lace are pulled back into the inner chamber of the axial cylinder.

17. The coupling method of the spool and the lace according to claim 12, wherein step S2 comprises: allowing one free end of the first free end and the second free end to pass through an uppermost space of the first lace insertion hole and the second lace insertion hole to enter the inner chamber of the axial cylinder, and allowing the other free end of the first free end and the second free end to pass through a lowermost space of the first lace insertion hole and the second lace insertion hole to enter the inner chamber of the axial cylinder.

* * * * *